March 17, 1964  L. D. HARMES  3,125,464
APPARATUS FOR COATING THE INSIDE SURFACE OF PIPE
Filed April 27, 1961  3 Sheets-Sheet 1
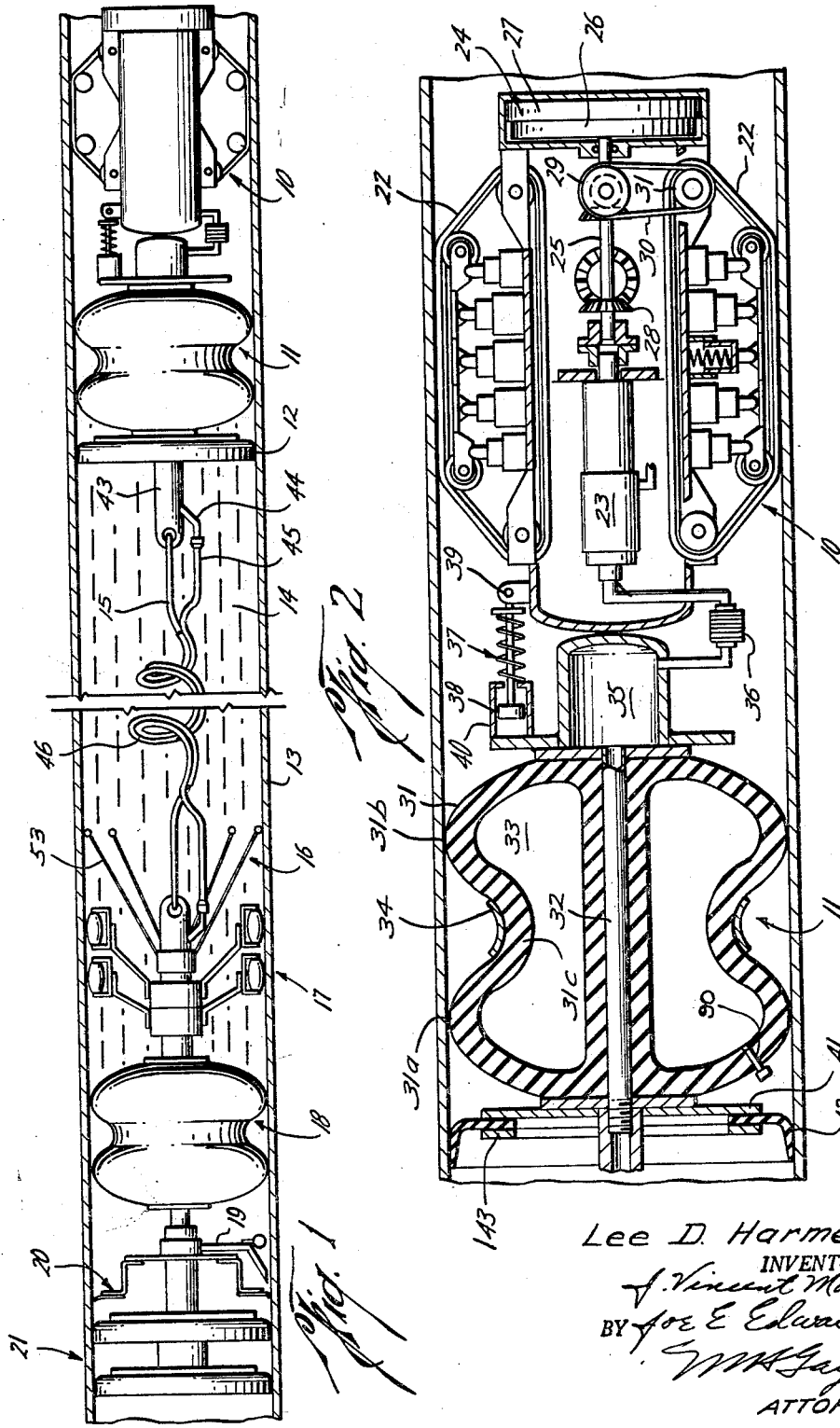
Lee D. Harmes
INVENTOR.

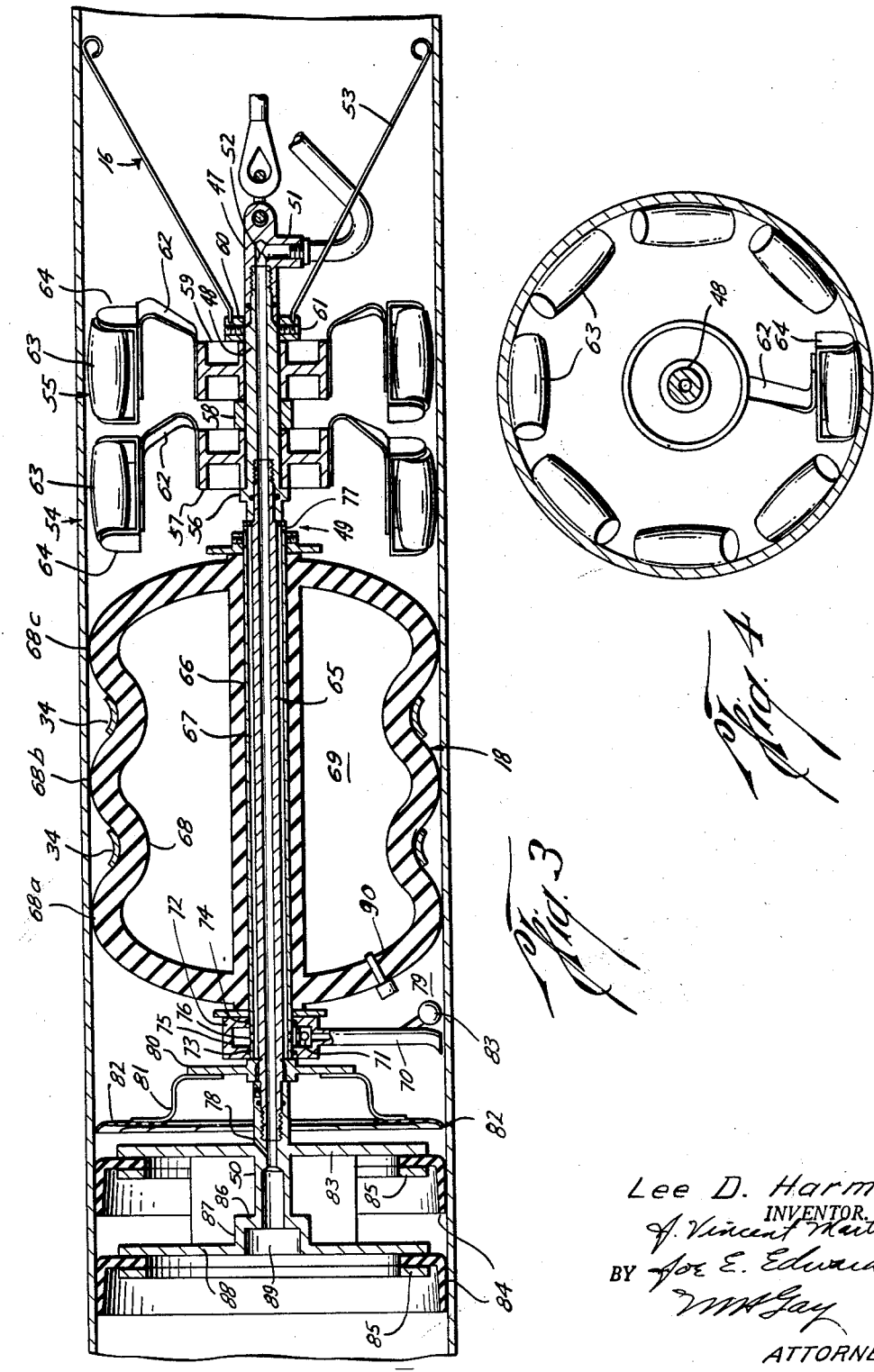

March 17, 1964 L. D. HARMES 3,125,464
APPARATUS FOR COATING THE INSIDE SURFACE OF PIPE
Filed April 27, 1961 3 Sheets-Sheet 3
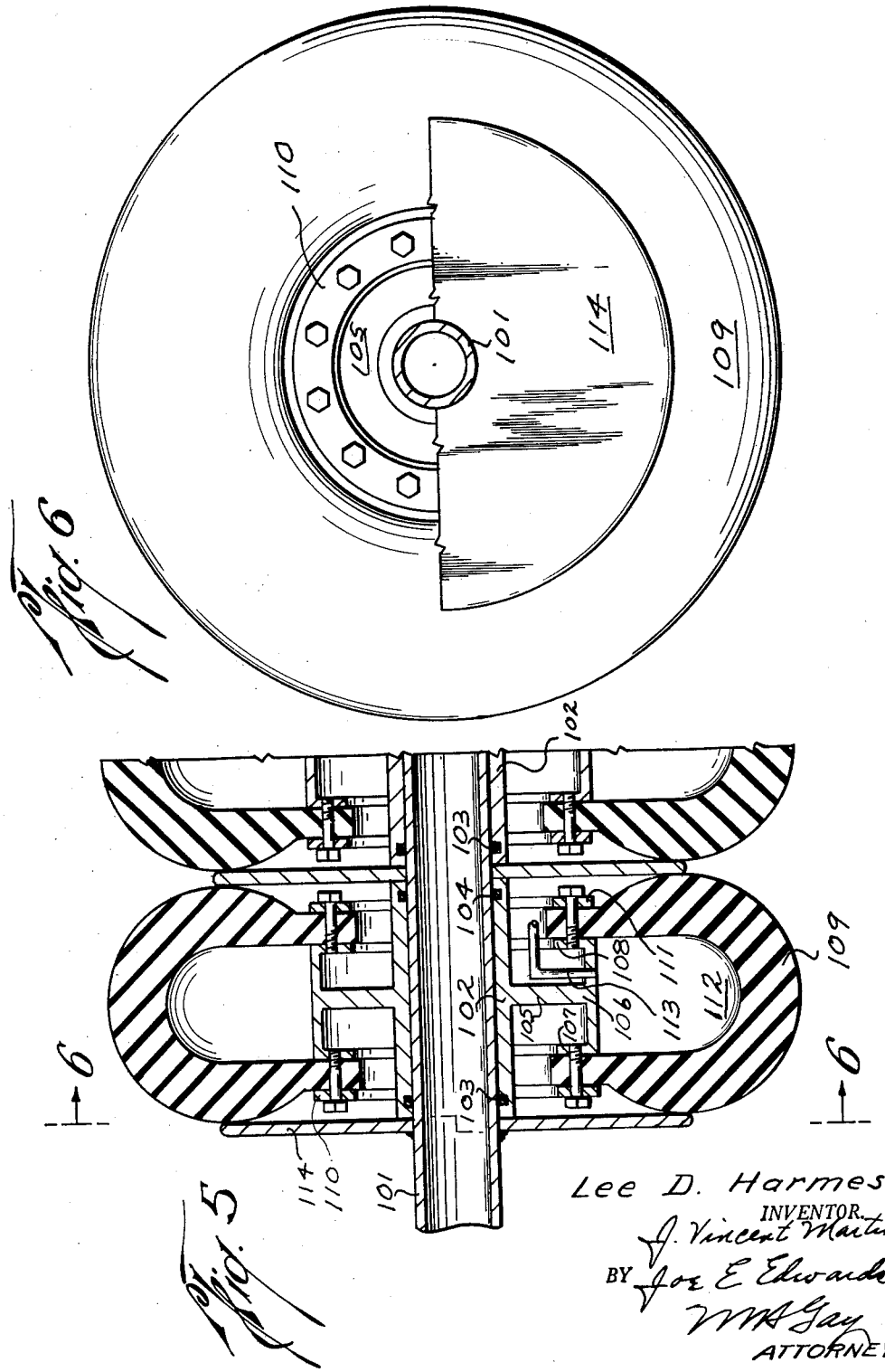
Lee D. Harmes
INVENTOR.
J. Vincent Martin
BY Joe E. Edwards
WM H Gay
ATTORNEYS

United States Patent Office 3,125,464
Patented Mar. 17, 1964

3,125,464
APPARATUS FOR COATING THE INSIDE SURFACE OF PIPE
Lee D. Harmes, Houston, Tex., assignor to Mission Manufacturing Company, Houston, Tex., a corporation of Texas
Filed Apr. 27, 1961, Ser. No. 105,931
10 Claims. (Cl. 118—105)

This invention relates to apparatus for treating pipe, and more particularly to apparatus for coating the internal wall of pipe which is in place in the ground.

For many years the art has sought a successful method of internally coating pipe which is in place in the ground. While this operation is presently being carried out, the methods employed leave much to be desired as they frequently leave large quantities of coating material at spots in the pipe. This substantially reduces the diameter of the pipe and thus the capacity of the pipe to convey fluids.

One principal reason for leaving spots of coating material is that the pigs which are utilized to contain the coating material tend to hang up and then jump in the pipe. The type of coating system referred to is shown in the Stephens Patent No. 2,445,645. In this type of system the coating material is carried through the pipe between two pigs utilizing cup-type seals. As the pigs pass through the pipe they sometimes hang up and an increase in pressure differential occurs before the pigs are released from the pipe. Upon release the pigs travel at an accelerated rate of speed and the pressure differential across the pigs is greatly reduced. As the pressure differential is relied upon to seal with a cup-type seal, it will be apparent that the sealing ability of the rear pig is seriously impaired at this time. As the seal does not function properly when the rear pig jumps ahead, large quantities of coating material are by-passed by the rear pig and remain in the pipe in heavy layers which may some times be an inch or more deep in the bottom of the pipe.

When the process illustrated in the Stephens patent is practiced with cup-type seals on each pig which face in both directions and the pigs jump, pressure fluid finds its way in between the two oppositely facing cup-type seals on each pig. When this happens, the differential in pressure across these cup-type seals reaches a value much lower than desirable for maintaining a good seal with the wall of the pipe and, not only will substantial amounts of coating material be by-passed at the time of the pig's jumping, but the pigs may travel a substantial distance before they again begin to function properly. During this time, of course, the rear pig will be by-passing a greater amount of coating material than desired.

In practicing the process of coating pipe with the coating material held between two pigs, the upper section of the pipe frequently is not coated. If any gas finds its way in to the coating material chamber, it will fill the upper section of the chamber, spreading the pigs apart as compared with their location with only coating material therebetween, thus resulting in a failure to coat throughout 360°. Also, when the pigs jump due to becoming hung in the pipe, they may separate and the level of the coating material drop so that the upper section of pipe is not coated.

It is an object of this invention to provide pipe coating apparatus in which the coating material is carried between spaced members and in which no more than a selected film of coating will be left upon the pipe wall regardless of the manner in which the apparatus travels through the pipe.

Another object is to provide apparatus for coating pipe in place in the ground in which a selected thickness coating will be applied, and there will not be present in the pipe any areas in which the coat will be substantially greater than the selected thickness.

Another object is to provide apparatus for coating pipe in place in the ground utilizing spaced members which confine coating material therebetween in which jumping of the members will not result in bypassing of a substantial quantity of coating material by the rearmost member.

Another object is to provide apparatus for coating pipe in place in the ground in which coating material is confined between two members which travel through the pipe and in which the amount of coating material wiped on the pipe is independent of the speed of the members traveling through the pipe, their position relative to each other, or the differential across one or both of the members, resulting in a substantially even thickness coating being applied.

Another object is to provide apparatus for coating pipe in the ground in which coating material is carried between two members which sealingly engage the pipe and in which a full 360° coverage is obtained in the pipe.

Another object is to provide apparatus for coating pipe in place in the ground in which coating material is moved through the pipe between two members which sealingly engage the pipe and in which the two members are forced to travel through the pipe at a substantially constant rate of speed.

Another object is to provide apparatus for coating pipe in place in the ground in which coating material is confined between two members which sealingly engage the pipe and in which the tendency of these members to hang up in the pipe is substantially reduced.

Another object is to provide apparatus for coating pipe in place in the ground in which coating material is confined between two members which sealingly engage the pipe and in which the rearmost member is followed by a sizing disc to remove any excess coating material which may have been left by the rearmost member, together with apparatus for conveying this excess coating material back to the chamber between the two confining members.

Another object is to provide a resilient bellows-like member for use in treating pipe which may be used as a drag or as a wiper for coating material in which the wiping or drag function may be adjusted for various degrees of wiping or dragging.

Another object is to provide a fluid-loaded member for engaging the wall of a pipe being treated and acting as a drag or coating material wiper in which the area of contact of the apparatus with the pipe wall can be increased to increase the dragging or wiping force, and in which the device engages the pipe wall at axially spaced points to avoid any tendency of the device to roll within the pipe.

Another object is to provide a bellows wiper or drag member for a pipe coating train in which the bellows is made up of a plurality of separate inflated tire-like members mounted coaxially on a single mandrel so that damage to some of the members will not impair the function of the remainder of the members.

Other objects, features and advantages will be apparent from the specification, the drawings and the claims.

In the drawings wherein like reference numerals indicate like parts, and wherein an illustrative embodiment of this invention is shown:

FIGURE 1 is a view in elevation of a coating train constructed in accordance with this invention with the train shown in place in a pipeline being coated;

FIGURE 2 is a view in vertical cross-section through the section of the coating train in front of the coating material chamber;

FIGURE 3 is a view similar to FIGURE 2 showing the remainder of the coating train with the exception of the interconnecting cable and hose;

FIGURE 4 is a view in end elevation of a portion of the roller coater assembly;

FIGURE 5 is a view in section through one and a fragment of another tire-like member which together form a modified form of bellows; and, FIGURE 6 is a view along the lines 6—6 of FIGURE 5 showing a side elevation with parts broken away.

The front of the train includes a speed control device indicated generally at 10, an inflated drag member indicated generally at 11, and a front fluid seal 12. The speed control and drag 11 regulate the speed of the train. The front seal 12 cooperates with the wall of the pipe 13 through which the train moves to provide the front end of a fluid chamber 14.

The front and rear sections of the train are interconnected by a flexible cable 15 so that if the rear section of the train hangs up for any reason the speed controller may function to provide additional power for forcing the rear section of the train to move forward in a manner which will be explained hereinafter.

The rear section of the train includes a catching basket 16 for preventing the overrunning of the cable 15 by the rear section of the train. Immediately rear of the basket 16 is a roller coater indicated generally at 17 which rotates spirally through the pipe to insure that the coating is applied throughout 360 degrees. Immediately to the rear of the roller coater is the wiper means 18 which cooperates with the pipe 13 to provide the rear seal of the coating material chamber 14 and to wipe onto the pipe a selected thickness coating.

To the rear of wiper means 18 is a siphon 19 and a sizing disc indicated generally at 20 which functions to further size the film of coating material applied to the pipe and to return any excess coating material to chamber 14.

At the extreme rear of the train is a rear fluid seal indicated generally at 21 against which fluid pressure in the rear of the pipe is applied to create a differential across the train and drive it through the pipe.

Due to the large area of rear seal means 21 a substantial force will usually be exerted upon the coating train. This force would move the train through the pipe faster than desired for good coating. To dissipate some of this force and to give positive control over the speed of the train through the pipe, a drag means is provided, preferably at the front of the coating train. This drag means may be provided by any desired structure which engages the wall of a pipe and slows the speed of the train. The drag means may be provided by either or both of the speed controller 10 and inflatable drag means 11. Preferably both are used.

The speed control means 10 is provided with a plurality of rotatable means such as endless belts 22 which engage the wall of pipe 13. The speed of rotation of endless belts 22 is suitably controlled to limit the speed of movement of the speed control 10 through the pipe. Preferably, this control means is provided by a fluid motor 23 which may be regulated in any desired manner as by governors, etc., to limit its speed and thus limit the r.p.m. of the endless belts 22. To provide positive control, it is preferable to have several means in the speed controller which limit the r.p.m. of endless belts 22 in response to the speed of the fluid motor 23. This additional means may take any desired form, such as the centrifugal brake indicated generally at 24. The shaft 25 which is driven by air motor 23 carries disc 26 of the centrifugal brake. Shoes are mounted on this disc to be thrown radially outward by rotation of the disc and engage drum 27 to frictionally oppose excess speed of rotation of driven shaft 25. In the conventional manner these shoes are spring-loaded inwardly. The shaft 25 is provided with a plurality of gears 28 on which are mounted sprockets 29. Suitable chains 30 interconnect sprocket 29 with the drive sprocket 31 for the endless belts 22. This chain of power transmission may also include non-reversible gears to prevent overrunning of the endless belts 22. From the above, it will be seen that the speed of the speed controller is positively held to a maximum value by the r.p.m. at which the fluid motor is set to operate. Any tendency of the speed controller to move faster than provided by fluid motor 23 will be opposed and the speed of the train through the pipe limited.

On occasions some portion of the coating train may become hung in the pipe. When this occurs, the fluid motor 23, which has in effect been acting as a drag or control, now begins to apply additional power to the train by providing rotative power to the endless belts 22. Thus, not only does the speed controller limit the speed of the train; it also tends to maintain the speed of the train at the desired velocity. As all of its pipe-engaging parts are movable, there will be little or no tendency for the speed controller itself to become hung in the pipe.

For a more complete description of the speed controller, reference is made to my co-pending application, Serial No. 43,473 for Pipe Treating Apparatus, filed July 18, 1960, now Patent No. 3,056,155.

The drag means 11 is preferably provided by a hollow resilient member 31 mounted on mandrel 32. The hollow space 33 within the resilient member provides an inflatable chamber to permit the member to be pressurized to any desired pressure through a suitable fitting 90. At one or more axially spaced points the resilient member 31 is encircled by a band 34 of smaller diameter than the maximum diameter of the body 31. This will produce the pleated effect illustrated in the drawings wherein sections of body 31, such as 31a and 31b, are of a diameter to engage the wall of the pipe and a section 31c intermediate thereof is held at a lesser diameter by band 34. The result is a bellows-like member which engages the pipe at axially spaced points therealong. This type of construction has many advantages. As the resulting bellows is substantially cylindrical in shape, there is no tendency for the bellows to roll as it passes through the pipe. The several axially spaced points of contact with the pipe provide successive seals so that if one of ribs 31a and 31b is damaged during travel through the pipe, the remaining rib will continue to seal. It might be pointed out that the coating train system may be operated against a back pressure, and in this instance the drag means 11 would act as a seal to confine the back pressure fluid to a point in front of the drag means 11. Further, by having a rubbing contact with the wall of the pipe at axially spaced points, the pressure of the bellows against the pipe can be more closely controlled. As will be pointed out hereinafter, this same type of structure is utilized as the wiping means to wipe a selected thickness coating of material on the wall of a pipe, and it is highly desirable to be able to closely control the force exerted by the resilient member 31 against the wall of the pipe. Furthermore, it will be appreciated that with a bellows-like member each of the ribs 31a and 31b will act as a sizing member, and if for any reason the front rib does not size the coating to the desired thickness, the ribs subsequently passing through the pipe will function to size the coating to the desired thickness. This feature is of particular advantage where a leading rib has been damaged in passing through the pipe, as subsequent rib or ribs will carry on the desired wiping function.

The mandrel 32 is hollow and provides a passageway for conducting pressure fluid through the drag means 11 to a gathering chamber 35 on the nose of the drag means 11. Pressure fluid is conveyed from the gathering chamber 35 to the fluid motor 23 of speed control means 10 through a suitable bellows connection 36 which permits relative movement between the drag means 11 and speed control means 10. The drag means 10 and 11 are connected together by a plurality of assemblies such as shown at 37.

The assembly 37 includes a spring-loaded piston-like member 38 pivoted to the speed controller at 39 and reciprocal within a cylinder-like member 40. The assembly 37 permits some relative movement between the speed controller means and bellows 11 while connecting them together so that the speed control means may be effective to apply a forward pull in the event of any other portion of the train hanging up in the pipe.

Immediately rearward of the bellows 11 is a seal means for preventing flow therepast of fluids from the rear of the seal means 12. The fluid immediately to the rear of seal means 12 will be the coating fluid, preferably an epoxy, and the seal means 12 will cooperate with the wall of pipe 13 to provide the front end of fluid chamber 14. It might be noted that while the drag means provided by speed controller 10 and bellows 11 are preferred, that the coating train might be used in some instances with the front end of the train provided by only a seal means such as shown at 12.

The seal means 12 may be any of the well known cup-type seal members such as illustrated in the drawings in which a generally cup-shaped member wipes against the wall of the pipe to provide a lip-type seal. In the form of seal illustrated a plate 41 is carried on mandrel 32 and an annular seal member 42 is clamped to plate 41 by a clamping ring 143. The seal member 42 at its extremity remote from the plate 41 is bent rearwardly and due to its inherent resiliency engages the wall of the pipe with sufficient force to provide an interference seal therewith. As is well known to those skilled in the art, a differential across this type of seal further increases the sealing pressure against the wall of the pipe to confine fluids to the rear of the seal and prevent such fluids from passing the seal.

The front and rear sections of the coating train are preferably connected together with a flexible cable 15 which is secured at its forward end to a stub mandrel 43 secured to the bellows mandrel 32. The stub mandrel is provided with an internal bore which connects with the bore in mandrel 32 and an inlet 44. A flexible hose 45 is secured to inlet 44 and conducts pressure fluid through inlet 44 and stub mandrel 43 to the bellows mandrel 32 for ultimate delivery to fluid motor 23 in the manner hereinabove explained.

In order to minimize the tendency of cable 15 and hose 45 to be overrun by the rear section of the train, they are secured to a helical coil spring 46. This spring permits the hose and cable to elongate and the cable to serve as a means for limiting the space between the front and rear sections of the train. When the front and rear sections of the train move closer to each other, the helical spring tends to resume its undistorted form and hold the cable 15 and hose 45 forward of the rear section of the train.

Referring now to the rear section of the coating train, the entire rear section is preferably made up on a several-piece central mandrel including a nose section 47, a roller coater mandrel 48, a wiper mandrel 49 and a mandrel section 50 on which the rear seal is mounted. Each of the mandrel sections is tubular in form with the exception of the nose section 47 which is tubular up to its front end and then closed. A side opening 51 in the nose mandrel 47 communicates with the bore 52 therein and the hose 45 is connected to the side opening 51. In this manner fluid under pressure is conveyed from the rear of the coating train through the several mandrel sections 47 through 50 to hose 45 and then to the speed controller.

A catching basket indicated generally at 16 is mounted on mandrel 48 and has a large number of forwardly and outwardly extending rods 53 which bear against the wall of the pipe. While only a few of the rods 53 are shown, a large number, such as 40, will normally be employed. In the event the rear section of the train does tend to overrun the cable 15 and hose 45, the overrun portion thereof will be forced ahead of the rear section of the coating train by basket 16 to prevent fouling of the train or any damage to hose 45.

A roller coater for insuring complete 360° coating of the pipe is indicated generally at 17 and is mounted on mandrel 48. Preferably two roller coaters 54 and 55 are employed. This insures that the remainder of the rear section of the train may be free from any torque created by rotation of the roller coaters, and more important as the roller coaters will be spiralling in opposite directions as the move down the pipe, the rollers will overlap each other and insure complete coverage of the pipe wall.

The mandrel section 48 has a collar 56. The bushing 57 of roller coater 54 rotates about the mandrel 48 and is positioned adjacent the collar 56. The two roller coaters are held in spaced relation by a spacer 58 interposed between bearing 57 and bearing 59 of roller coater 55. The mounting collar 60 for the catching basket 16 holds the roller coaters in place and is secured to the mandrel by lock screws 61.

The bearings 57 and 59 have secured thereto U-shaped springs 62. Rollers 63 carried in U-shaped mounting brackets 64 are secured to spring 62. The rollers 63 may be provided of any suitable material for carrying coating material across the top of the pipe to insure complete coating of the pipe wall. To provide rotational movement of the roller coaters, the rollers rotate about axes which are parallel to the pipe wall and perpendicular to a spiral on the pipe wall that is, the axes of rotation of the rollers are at an angle to the axis of rotation of all of the rollers as a whole. Thus, the rollers will engage the pipe wall throughout substantially their entire length but will be angled relative to the central axis of the pipe as shown in FIGURES 3 and 4. Thus, as the coating train moves through the pipe the forces on the roller coaters will cause them to rotate about their central axis. As the coating rollers 63 of roller coater 54 are angled in an opposite direction to those of roller coater 55, the two roller coaters will rotate in opposite directions.

Immediately rearward of the roller coater assembly is a wiper means for cooperating with the wall of the pipe to provide the rear end of seal chamber 14 for containing coating material. The wiper means 18 also wipes onto the pipe wall a selected thickness of coating material. For purposes which will appear hereinafter, the wiper means mandrel 49 is constructed with two passages therethrough. Preferably, the mandrel section 49 is provided by two concentric pipes with the inner pipe 65 secured to mandrel sections 48 and 50, and the outer pipe 66 secured to the pipe 65 at each end of pipe 66. As will be explained hereinafter, the annulus 67 between the two pipes 65 and 66 functions as a portion of the siphon for returning coating material to the chamber 14.

The wiper means 18 includes a hollow resilient body 68 which is molded on the mandrel 49. This hollow body of resilient material is substantially the same as the bellows construction of the drag means 11 except that in this instance two bands 34 are employed so that the bellows will have three annular surfaces 68a, 68b and 68c in contact with the pipe wall. The bands 34 are of lesser diameter than the surfaces 68a, 68b and 68c to provide an exterior, generally cylindrical surface to the wiper means 18 which, when viewed in section, is serpentine in form. The bellows is again provided with a suitable fitting 90 for pressurizing the hollow space 69 within the bellows to the desired pressure. The force of contact of the rings 68a, 68b and 68c will be dependent upon the amount of pressure within space 69. The wiper means 18 will wipe onto the pipe wall a thickness of coating material which may be selected by the extent to which the space 69 is pressurized. Each of the annular ribs 68a, 68b and 68c will function to size the coating of the wall of the pipe, and it is particularly pointed out that if any one of the ribs is damaged the effectiveness of the coating train will not be destroyed as the remaining ribs will continue to function to wipe onto the pipe wall the desired thickness of coating material.

It should be emphasized that the seal provided by wiper means 18 is independent of all other factors with the exception of the pressure within the bellows, and so long as this pressure remains intact a sealing force will continuously be exerted on the pipe wall and the wiper means will function to contain the coating material within chamber 14. This should be contrasted with the cup-type seals which have been utilized in the past as wiper means which under certain circumstances would collapse and bypass large amounts of coating material. Due to the independent seal provided by pressurizing the bellows 18, the coating material will be contained under all conditions of operation of the coating train through the pipeline.

While the bellows 18 might be constructed of any desired resilient material, it is preferable that it be constructed of a material having a low coefficient of friction with steel so that it will function substantially only as a wiping means and not as a drag means. Of course, it could be constructed of a material having a higher coefficient of friction with steel to provide a portion of the drag as well as function as the wiping means.

It is particularly noted that if the train becomes hung in the pipe and then jumps, the pressurized wiping means 18 will perform its normal wiping operation even under this acceleration and wipe onto the pipeline approximately the same thickness coat which it has been wiping on under normal operations. Thus, large amounts of coating material will not be left in the pipe at the location at which the coating train jumped, as has been true with the prior art types of coating trains in which the rear seal for the coating chamber depended upon the maintenance of a differential across a sealing member such as a cup-type seal.

Immediately to the rear of the wiper means 18 there is provided the inlet tube 70 of a siphon means. The inlet tube has a check valve 71 therein permitting flow upwardly through the tube but preventing reverse flow. The tube connects with sleeve 72 which is rotatable on the outer pipe 66 of mandrel 49 and sealed thereto by spaced O-rings 73 and 74. The pipe 70 communicates with a gathering ring 75 in sleeve 72 which in turn communicates with the annulus 67 through a plurality of ports 76 in the outer pipe 66. At the front end of the bellows the outer pipe 66 is provided with a plurality of ports 77 which place the annulus 67 in fluid communication with the chamber 14. A small bleed hole 78 is provided in mandrel 50 so that pressure fluid from behind the train will be present in the area 79 (FIG. 3) between the wiper means 18 and the rear fluid seal 21.

Immediately to the rear of the siphon tube 70 a sizing disc 20 is provided. Preferably a support ring 80 is mounted on mandrel 49 and a wiper carrier 81 is mounted on ring 80. Secured to the wiper carrier 81, which has a slightly lesser maximum diameter than the inner diameter of the pipe, are a plurality of overlapping resilient members 82. These resilient members 82 extend radially outwardly and wipe against the wall of the pipe to further size the coating thickness applied to the pipe. In the event any excess coating is passed by the wiper means 18 the sizing disc 20 will size the coating applied and push in front of it the excess coating. It will be noted that the inlet pipe 70 of the siphon means is positioned closely adjacent the pipe and as it is rotatably mounted its weight will maintain it at the bottom of the pipe. If desired, an additional weight 83 may be hung on the siphon pipe 70 to insure its remaining in the bottom of the pipe. Any excess epoxy wiped in front of the wiping disc 20 will rise to a level above the inlet of the siphon pipe 70 and the pressure in chamber 79 will force this excess coating material through the siphon back into the coating reservoir chamber 14.

It might be noted that in some instances the siphon will be used and in other instances it will be left out. While it has the advantage of returning any excess coating material which is bypassed to the coating chamber, it has the disadvantage of applying pressure from behind the coating train directly to the coating chamber through the siphon. In practice, the siphoning action would probably occur as the pressure in chamber 79 varied relative to the pressure in the coating chamber 14 due to acceleration and deacceleration of the front and rear sections of the coating train. Thus, as pressure in the chamber 14 tends to drop due to the front and rear sections of the train pulling away from each other, the siphon would be effective to transfer coating material to the chamber 14. As the front and rear sections of the train move together and raise the pressure in chamber 14, the check valve 71 would prevent return of coating material to area 79. With the siphon some pressure fluid, usually gas, from the rear of the train would find its way into chamber 14 and rise to the top of the pipe. This would provide a strip along the top of the pipe which would depend upon the roller coaters for insuring a complete 360° coat. As the system without the siphon is constructed to exclude, as far as possible, any gas from the coating chamber, the chamber will normally be substantially completely filled with coating liquid which will insure 360° coverage of the pipe wall, and for this reason it will be preferred to eliminate the siphon in cases where the tendency of the wiping means to bypass any excess fluid is very little. For instance, where a fairly smooth wall pipe is being coated, it would probably be preferred to eliminate the siphon means. On the other hand, where a very rough wall is being coated, there will be a greater tendency for the wiping means to have difficulty in sizing the coat to the desired thickness and the wiping discs and siphon would provide a means of returning any coating material bypassed by the wiping means 18 to the chamber 14, and thus give greater assurance of obtaining the desired thickness coating.

Immediately to the rear of the sizing disc 20 there is provided seal means for confining fluid pressure to the rear of the train and preventing it passing the seal means so that this pressure may be utilized to propel the train forward. Preferably, this seal means is provided by one or more cup-shaped seal members. The front seal means shown includes a mounting plate 83 secured to mandrel 50 which has a cup-type seal ring 84 mounted thereon by mounting ring 85. A second cup-type seal is provided at the rear end of mandrel 50. The mounting plate for the rearmost seal includes a small ring 86 secured to mandrel 50, a section of tubular material 87 secured to ring 86 and extending rearwardly therefrom beyond mandrel 50, and a mounting plate 88 secured to the tubular member 87. It will be noted that a large diameter bore 89 is provided within tubular member 87 to provide a gathering area for pressure fluid being transmitted through the mandrel sections 47 through 50. Secured to the mounting plate 88 is a cup-shaped resilient seal ring 84 which is held in place by a mounting ring 85. These cup-type seals are preferred, but it will be understood that any desired type of seal means which will seal against pasage of fluid from the rear of the train past this seal, may be employed. Of course, many forms of cup-type seals are used in the industry and might be substituted for the specific seal means 21 which is shown.

In operation, the train is introduced into a pipe to be coated in any desired manner as through a pig trap. The front section of train might be introduced into a trap and then moved forward in the pipe by applying pressure from an outside source to the mandrel passing through the rear portion of the train by a suitable fitting introduced into mandrel 50. This fluid pressure would operate motor 23 which would drive the front section of the train into the pipe to the desired distance. Thereafter, the rear section of the train could be introduced into the trap and the trap door closed. Coating material will preferably be introduced into the pipe by opening two stand pipes in the pipe intermediate the front and rear sections of the train and introducing coating material through one while permitting gas within the pipe to escape through the other until the chamber 14 is completely filled.

In inserting the trains, the two bellows might be preloaded, or, as they are introduced into the pipe and before the next succeeding portion of the train is introduced into the pipe, they might be pressurized to the desired pressure.

In loading a train which does not include the speed controller, the front section of the train might be introduced into the pipe and the end of cable 15 which connects to the rear section of the train held at the entrance to the pig trap. The pig trap could then be closed and pressure exerted against seal 12 to move the front section of the train forward to the limits permitted by cable 15. The pressure would then be bled off, the pig trap door opened, the cable 15 connected to the rear section of the train and the rear section of the train introduced into the pipe. It will, of course, be apparent that the train could be introduced in this manner where the speed controller is employed by feeding pressure fluid to the rear end of conduit 45 to drive the speed controller forward to the limits of extension of cable 15. Thereafter, the cable 15 and conduit 45 could be connected to the rear section of the train which would then be introduced into the pipe.

After the chamber 14 has been filled, a suitable differential is provided across the train to drive it through the pipeline. The desired differential would, of course, depend on whether the speed controller be employed and on the degree of inflation of the drag means 11. As soon as the differential comes up to the selected value, the train begins to move through the pipe and the entire body of coating material is passed therethrough while being confined by the front seal 12 and the wiper seal 18. Forward motion of the train will cause the roller coaters 17 to rotate spirally in opposite directions and insure a complete covering of coating material within the pipe. The wiper means 18 will wipe onto the pipe wall the selected thickness coating. Where the siphon is used, any excess coating material will build up ahead of the sizing disc 20 and be returned to the chamber 14 by the siphon.

As there is not present a forwardly facing cup, the chances of any portion of the train hanging in the pipe are greatly minimized. However, if any section of the train does tend to hang up, the speed control means will immediately begin to function as a driving means to provide additional power to drive the train through the pipe. If there is any tendency of any portion of the train to jump, this will not appreciably affect the resulting coating. For instance, if the front section jumped, thus permitting the level of coating material in chamber 14 to lower, the roller coaters 17 would insure complete coating of the pipe. If the rear sections were to jump, the wiper means 18 would maintain its desired pressure contact with the wall of the pipe and would wipe onto the pipe approximately the desired thickness coating. Therefore, the train of this invention will not leave large deposits of coating material in the pipe when the train jumps, as has been the case in the past.

Where the speed controller is employed, the interconnecting cable should be used so that the conduit 45 will not be parted, and the power available from the speed controller when the train slows may be used to move the rear section of the train forward. Where the speed controller is not used, the front and rear of the train are desirably connected together, but the cable may be omitted if desired.

As mentioned hereinabove, the siphon means may be employed or omitted.

Referring now to FIGURES 5 and 6, a modified form of bellows is illustrated. The modified form of bellows might be used as a drag means in the place of bellows 18, or it might be used as a wiper means in the place of bellows 11. The modified bellows is made up of a plurality of individually sealed members which generally resemble tires, and it will be noted that the surface which engages the pipe generally resembles the other bellows in that there are areas of material in contact with the pipe followed by areas out of contact with the pipe, which are in turn followed by other areas of seal material in contact with the pipe. Thus, the modified bellows will function in a manner similar to that previously explained.

The modified bellows is made up on a mandrel 101 which might take the place of either mandrel 32 of the forward bellows of the coating train of FIGURE 1, or the mandrel 66 of the rear bellows of the coating train of FIGURE 1.

Rotatably and sealingly secured about mandrel 101 are one or more wheels 102. The seals between the mandrel and wheels are provided by one or more O-rings 103 and 104.

The wheels 102 are provided with means for mounting tire-shaped members thereon. In the preferred form this includes an annular part which is T-shaped in cross section. This annular part is made up of a radially extending flange 105 which is the standard of the T. The cross of the T is provided by a part 106 which extends co-axially with mandrel 101. Radially inwardly extending tips are provided at 107 and 108 at the ends of cross 106. Sealingly secured to each wheel is a tire-shaped member 109 of resilient material. The member 109 may be clamped to members 107 and 108, respectively, by suitable clamping rings 110 and 111.

A connection for providing pressure fluid to the hollow section 112 of the resilient body 109 is provided by connection 113.

In order to support the resilient member 109 against a tendency to roll in an axial direction, an outwardly extending anti-roll flange 114 is provided on the trailing side of each body 109. As shown, these flanges extend radially outward to a point to be engaged by the resilient body and supported against a tendency to roll in an axial direction. The greater the radial extent of the flange, the greater the support against a rolling tendency as the bellows moves through a pipe.

In using the modified form of bellows the mandrel 101 may be substituted for the mandrel 66 of the rear bellows of the train or the mandrel 32 of the front bellows of the train to make it an integral part of the train. The pressure chamber 112 will be inflated to the desired pressure, and it will be noted that each of the tires has a separate pressure compartment. If any damage occurs to one of the tires in moving through a pipe, then the other tires will remain intact and will continue to function. This will insure against failure of the bellows unless part of the tires are punctured. The above explained effect of bands about intermediate portions of a single bellows is obtained by the use of side by side individual tire-like bodies. A plurality of these bodies will engage the pipe along a cylindrical surface, and there will be little tendency to roll. As they may be inflated to selected pressures and fabricated from selected material, they may maintain any desired pressure contact with the wall of the pipe and may have any desired coefficient of friction therewith.

In addition to having the advantages of the previously disclosed bellows, the tire-shaped bellows when used as a plurality have the additional advantage of being rotatable relative to each other so that wear on all bellows will tend to be distributed throughout the entire circumference of each tire-shaped member. It will be apparent that if excessive wear is noted at a common circumferential position on all of the tire-shaped bodies, that they may be rotated relative to each other before the next run to distribute the worn areas at different points circumferentially of the bellows.

It will, of course, be apparent that where the bellows is attached to other devices which would reduce the tendency to roll, that only a single tire-shaped body might be used under some circumstances. However, it will usually be preferred to use a plurality of these bodies to reduce the tendency to roll and to provide a large area for contact with the pipe wall when used as a drag member, and to provide successive wiping actions when used as a wiper.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. Apparatus for coating the interior of pipe comprising, seal means for engaging the wall of the pipe and preventing flow therepast of fluids from the rear of the seal means, wiper means provided by a hollow body of resilient material inflated to a selected pressure engaging the wall of the pipe rearwardly of said seal means, said seal means and wiper means defining with the pipe to be coated a chamber for containing liquid coating material to be applied to the pipe, said wiper means leaving on the pipe a selected thickness coating as the apparatus passes through a pipe and rearwardly facing cup-type seal means rearwardly of and connected to the wiper means for engaging the pipe wall and preventing flow therepast of fluids from the rear thereof.

2. Apparatus for coating the interior of pipe comprising, drag means engaging the wall of a pipe and limiting the speed of the apparatus as it travels through a pipe, seal means connected to the rear of the drag means for engaging the wall of the pipe and preventing flow therepast of fluids from the rear of the seal means, wiper means provided by a hollow body of resilient material inflated to a selected pressure engaging the wall of the pipe rearwardly of said seal means, said seal means and wiper means defining with the pipe to be coated a chamber for containing liquid coating material to be applied to the pipe, said wiper means leaving on the pipe a selected thickness coating as the apparatus passes through a pipe and rearwardly facing cup-type seal means rearwardly of and connected to the wiper means for engaging the pipe wall and preventing flow therepast of fluids from the rear thereof.

3. Apparatus for coating the interior of pipe comprising, drag means engaging the wall of a pipe and limiting the speed of the apparatus as it travels through a pipe, rearwardly facing resilient cup seal means connected to the rear of the drag means for engaging the wall of the pipe and preventing flow therepast of fluids from the rear of the cup seal means, wiper means provided by a hollow body of resilient material inflated to a selected pressure engaging the wall of the pipe rearwardly of said cup seal means, said cup seal means and wiper means defining with the pipe to be coated a chamber for containing liquid coating material to be applied to the pipe, said wiper means leaving on the pipe a selected thickness coating as the apparatus passes through a pipe, and rearwardly facing cup-type seal means rearwardly of and connected to the wiper means for engaging the pipe wall and preventing flow therepast of fluids from the rear thereof.

4. Apparatus for coating the interior of pipe comprising, drag means provided by a hollow body of resilient material inflated to a selected pressure engaging the wall of a pipe and limiting the speed of the apparatus as it travels through a pipe, rearwardly facing resilient cup seal means connected to the rear of the drag means for engaging the wall of the pipe and preventing flow therepast of fluids from the rear of the cup seal means, wiper means provided by a hollow body of resilient material inflated to a selected pressure engaging the wall of the pipe rearwardly of said cup seal means, said cup seal means and wiper means defining with the pipe to be coated a chamber for containing liquid coating material to be applied to the pipe, said wiper means leaving on the pipe a selected thickness coating as the apparatus passes through a pipe, and rearwardly facing cup-type seal means rearwardly of and connected to the wiper means for engaging the pipe wall and preventing flow therepast of fluids from the rear thereof.

5. Apparatus for coating the interior of pipe comprising, speed control means having rotatable members in frictional contact with the pipe wall and means including a governed fluid motor for driving the rotating members and maintaining the rate of speed of the rotating members substantially constant, rearwardly facing resilient cup seal means connected to the speed control means for engaging the wall of the pipe and preventing flow therepast of fluids from the rear of the cup seal means, wiper means provided by a hollow body of resilient material inflated to a selected pressure engaging the wall of the pipe rearwardly of said cup seal means, said cup seal means and wiper means defining with the pipe to be coated a chamber for containing liquid coating material to be applied to the pipe, said wiper means leaving on the pipe a selected thickness coating as the apparatus passes through a pipe, rearwardly facing cup-type seal means rearwardly of and connected to the wiper means for engaging the pipe wall and preventing flow therepast of fluids from the rear thereof, means connecting the drag means and wiper means together, and conduit means extending through the apparatus from the speed control means to the rear of the apparatus for conducting fluid to said fluid motor.

6. Apparatus for coating the interior of pipe comprising; drag means provided by a hollow body of resilient material inflated to a selected pressure engaging the wall of the pipe, and speed control means having rotatable members in frictional contact with the pipe wall and means including a governed fluid motor for driving the rotating members and maintaining the rate of speed of the rotating members substantially constant; rearwardly facing resilient cup seal means connected to the rear of the drag means for engaging the wall of the pipe and preventing flow therepast of fluids from the rear of the cup seal means; wiper means provided by a hollow body of resilient material inflated to a selected pressure engaging the wall of the pipe rearwardly of said cup seal means; said cup seal means and wiper means defining with the pipe to be coated a chamber for containing liquid coating material to be applied to the pipe, said wiper means leaving on the pipe a selected thickness coating as the apparatus passes through a pipe, rearwardly facing cup-type seal means rearwardly of and connected to the wiper means for engaging the pipe wall and preventing flow therepast of fluids from the rear thereof, means connecting the drag means and wiper means together, and conduit means extending through the apparatus from the speed control means to the rear of the apparatus for conducting fluid to said fluid motor.

7. Apparatus for coating the interior of pipe comprising, drag means engaging the wall of a pipe and limiting the speed of the apparatus as it travels through a pipe, seal means connected to the rear of the drag means for engaging the wall of the pipe and preventing flow therepast of fluids from the rear of the seal means, wiper means provided by a hollow body of resilient material inflated to a selected pressure engaging the wall of the pipe rearwardly of said seal means, said seal means and wiper means defining with the pipe to be coated a chamber for containing liquid coating material to be applied to the pipe, said wiper means leaving on the pipe a selected thickness coating as the apparatus passes through a pipe, and a roller coater connected to one of said seal means and wiper means and rotating in said chamber, said roller coater having a plurality of arms mounted for rotation about the central axis of the pipe, a paint roller on each of said arms mounted for rotation about an axis which is at an angle relative to the axis of rotation of said plurality of arms and perpendicular to a spiral on the pipe wall whereby movement of the roller coater through the pipe will cause the arms to rotate and the rollers to travel in a spiral path through the pipe.

8. Apparatus for coating the interior of pipe comprising, drag means engaging the wall of a pipe and limiting the speed of the apparatus as it travels through a pipe, rearwardly facing resilient cup seal means connected to the rear of the drag means for engaging the wall of the pipe and preventing flow therepast of fluids from the rear of the cup seal means, wiper means provided by a hollow body of resilient material inflated to a selected pressure engaging the wall of the pipe rearwardly of said cup seal means, said cup seal means and wiper means defining with the pipe to be coated a chamber for containing liquid coating material to be applied to the pipe, said wiper means leaving on the pipe a selected thickness coating as the apparatus passes through a pipe, rearwardly facing cup-type seal means rearwardly of and connected to the wiper means for engaging the pipe wall and preventing flow therepast of fluids from the rear thereof, means connecting the drag means and wiper means together, and means for returning to said chamber any excess coating material which escapes past said wiper means including, a bleed passage through said seal means connected to the wiper means to pressurize the area between said last mentioned seal means and said wiper means, sizing disc means carried by the wiper means in said area and scraping excess coating material from the wall of the pipe, siphon means having its inlet in front of the sizing disc means and extending through the wiper means with its outlet in said chamber, and check valve means in said siphon preventing flow of coating material from said chamber to said area.

9. Apparatus for use in treating pipelines comprising, a hollow body of resilient material, means for introducing a fluid under pressure into said body, and at least one band fixed about the outer periphery of said body, said band being of smaller diameter than said body at its point of greatest diameter and preventing expansion of said body under pressure in the area of said band whereby the body will assume the shape of a bellows.

10. Apparatus for use in treating the interior surface of a pipe comprising, a mandrel, a hollow body of resilient material fixed on said mandrel, means for introducing fluid under pressure into said hollow body, at least one band arranged co-axially with said mandrel and extending about said body, the diameter of said body on opposite sides of said band being greater than the diameter of the band so that the resilient body will assume the general shape of a bellows and engage the wall of a pipe on opposite sides of each band when the apparatus travels through a pipe.

References Cited in the file of this patent

UNITED STATES PATENTS

| | | |
|---|---|---|
| 1,683,336 | Cummings | Sept. 4, 1928 |
| 2,445,645 | Stephens | July 20, 1948 |
| 2,480,358 | Curtis et al. | Aug. 30, 1949 |
| 2,843,154 | Hosking | July 15, 1958 |
| 2,950,702 | Ferguson et al. | Aug. 30, 1960 |

FOREIGN PATENTS

| | | |
|---|---|---|
| 381,307 | Great Britain | Oct. 6, 1932 |
| 291,361 | Switzerland | Aug. 17, 1942 |